(12) United States Patent
Richardson

(10) Patent No.: US 10,940,896 B2
(45) Date of Patent: Mar. 9, 2021

(54) REINFORCING DEVICES

(71) Applicant: Zephyros, Inc., Romeo, MI (US)

(72) Inventor: Henry E. Richardson, Washington, MI (US)

(73) Assignee: Zephyros, Inc., Romeo, MI (US)

( * ) Notice: Subject to any disclaimer, the term of this patent is extended or adjusted under 35 U.S.C. 154(b) by 67 days.

(21) Appl. No.: 16/474,252

(22) PCT Filed: Jan. 11, 2018

(86) PCT No.: PCT/US2018/013332
§ 371 (c)(1),
(2) Date: Jun. 27, 2019

(87) PCT Pub. No.: WO2018/132579
PCT Pub. Date: Jul. 19, 2018

(65) Prior Publication Data
US 2020/0122784 A1    Apr. 23, 2020

Related U.S. Application Data

(60) Provisional application No. 62/445,048, filed on Jan. 11, 2017.

(51) Int. Cl.
*B60J 7/00* (2006.01)
*B62D 29/00* (2006.01)
(Continued)

(52) U.S. Cl.
CPC ............ *B62D 29/002* (2013.01); *B29C 44/18* (2013.01); *B29K 2063/00* (2013.01);
(Continued)

(58) Field of Classification Search
CPC ... B62D 29/002; B62D 25/00; C08L 2666/02; B29C 44/18; B29C 65/4855; A01F 15/07;
(Continued)

(56) References Cited

U.S. PATENT DOCUMENTS 6,058,673 A * 5/2000 Wycech .................. B29C 44/18
52/834
6,341,467 B1 * 1/2002 Wycech .................. B29C 44/18
296/193.06

(Continued)

FOREIGN PATENT DOCUMENTS

EP    1122153 A3    10/2003
EP    1932648 A1    6/2008
(Continued)

*Primary Examiner* — Kiran B Patel
(74) *Attorney, Agent, or Firm* — The Dobrusin Law Firm, PC

(57) ABSTRACT

A structural reinforcement comprising a rigid polymeric structure (12) including a central portion (20) and two side portions (22,24) adjacent the central portion, each of the central portion and side portions including a top surface and bottom surface and an expandable adhesive material (14) located onto at least one surface of each of the central portions and two side portions, wherein the expandable adhesive material is located along the bottom surface of the central portion and the top surface of each of the side portions.

20 Claims, 6 Drawing Sheets

(51) Int. Cl.
*B29C 44/18* (2006.01)
*B29K 63/00* (2006.01)
*B29L 31/30* (2006.01)
*B62D 25/00* (2006.01)

(52) U.S. Cl.
CPC ............ *B29L 2031/30* (2013.01); *B62D 25/00* (2013.01); *B62D 29/005* (2013.01)

(58) Field of Classification Search
CPC .......... A01F 2015/0795; A01F 15/0833; A01F 15/141; A01F 2015/077
See application file for complete search history.

(56) References Cited

U.S. PATENT DOCUMENTS

| | | | |
|---|---|---|---|
| 6,467,834 B1* | 10/2002 | Barz | B62D 25/04 296/187.02 |
| 6,793,274 B2* | 9/2004 | Riley | B62D 21/152 296/187.03 |
| 6,935,681 B2 | 8/2005 | Hasler et al. | |
| 7,125,461 B2* | 10/2006 | Czaplicki | B62D 29/002 156/79 |
| 7,673,930 B2 | 3/2010 | Stratman | |
| 7,735,906 B2* | 6/2010 | Takahashi | B62D 25/04 296/193.06 |
| 7,926,867 B2* | 4/2011 | Kochert | B62D 29/002 296/187.02 |
| 8,020,924 B2 | 9/2011 | Niezur et al. | |
| 8,361,589 B2 | 1/2013 | Kraushaar | |
| 8,366,181 B2 | 2/2013 | Belpaire | |
| 8,388,037 B2 | 3/2013 | LaNore et al. | |
| 9,592,858 B2 | 3/2017 | Kraushaar | |
| 10,308,286 B2* | 6/2019 | Yang | B62D 29/005 |
| 10,597,094 B2* | 3/2020 | Meaige | B62D 25/04 |
| 2002/0125739 A1 | 9/2002 | Czaplicki | B62D 29/002 296/187.02 |
| 2002/0160130 A1* | 10/2002 | Sheldon | B62D 25/00 428/34.1 |
| 2004/0046421 A1* | 3/2004 | Barz | B62D 29/002 296/187.02 |
| 2004/0104598 A1* | 6/2004 | Barz | B62D 25/04 296/187.02 |
| 2004/0164588 A1* | 8/2004 | Lutz | B62D 29/002 296/187.02 |
| 2006/0008615 A1* | 1/2006 | Muteau | B29C 45/0046 428/116 |
| 2007/0018483 A1* | 1/2007 | Kerscher | B62D 29/002 296/187.02 |
| 2008/0257491 A1* | 10/2008 | Czaplicki | B62D 29/04 156/293 |
| 2008/0296164 A1* | 12/2008 | Dajek | B62D 29/004 205/80 |
| 2009/0085379 A1 | 4/2009 | Takahashi | |
| 2009/0091157 A1* | 4/2009 | Niezur | B62D 25/00 296/187.02 |
| 2009/0096251 A1* | 4/2009 | Niezur | F16F 1/3737 296/187.02 |
| 2009/0167055 A1* | 7/2009 | Niezur | B60R 21/04 296/187.02 |
| 2010/0015427 A1 | 1/2010 | Belpaire et al. | |
| 2010/0092733 A1 | 4/2010 | Blank et al. | |
| 2010/0117397 A1* | 5/2010 | Richardson | B29C 65/4855 296/187.02 |
| 2010/0253004 A1 | 10/2010 | Lehmann et al. | |
| 2011/0049323 A1 | 3/2011 | Belpaire et al. | |
| 2011/0104413 A1* | 5/2011 | Mendibourne | B62D 29/002 428/35.7 |
| 2011/0189428 A1 | 8/2011 | Belpaire et al. | |
| 2011/0206890 A1 | 8/2011 | Belpaire et al. | |
| 2011/0236610 A1 | 9/2011 | Belpaire | |
| 2011/0236616 A1 | 9/2011 | Belpaire | |
| 2012/0043019 A1* | 2/2012 | Belpaire | B29C 44/1228 156/293 |
| 2012/0141724 A1 | 6/2012 | Belpaire et al. | |
| 2012/0207986 A1 | 8/2012 | Belpaire et al. | |
| 2012/0235401 A1* | 9/2012 | Richardson | B62D 27/023 285/285.1 |
| 2013/0181470 A1 | 7/2013 | LaNore et al. | |
| 2015/0165737 A1* | 6/2015 | Richardson | B32B 27/34 428/172 |
| 2015/0375800 A1 | 12/2015 | Wagner | |
| 2016/0229456 A1* | 8/2016 | Boettcher | B62D 27/026 |
| 2017/0072887 A1* | 3/2017 | Richardson | B62D 29/048 |
| 2018/0022397 A1* | 1/2018 | Richardson | B62D 29/002 296/187.03 |
| 2018/0037703 A1* | 2/2018 | Richardson | B29C 44/3484 |
| 2019/0002029 A1* | 1/2019 | Niggemann | B62D 29/008 |
| 2019/0144047 A1* | 5/2019 | Belpaire | B62D 29/002 296/202 |
| 2019/0144050 A1* | 5/2019 | Belpaire | B62D 25/04 296/187.01 |
| 2019/0382056 A1* | 12/2019 | Shantz | B62D 25/00 |
| 2020/0086924 A1* | 3/2020 | Stibich | B62D 25/04 |
| 2020/0130749 A1* | 4/2020 | Qian | B62D 29/002 |
| 2020/0247473 A1* | 8/2020 | Shehu | B62D 25/04 |
| 2020/0262492 A1* | 8/2020 | Richardson | B62D 25/00 |

FOREIGN PATENT DOCUMENTS

| | | |
|---|---|---|
| EP | 1373053 B1 | 12/2008 |
| EP | 2019027 A1 | 1/2009 |
| EP | 2117909 A1 | 11/2009 |
| EP | 2121270 A1 | 11/2009 |
| EP | 2147848 A1 | 1/2010 |
| EP | 2154052 A1 | 2/2010 |
| EP | 2159109 A1 | 3/2010 |
| EP | 2159136 A1 | 3/2010 |
| EP | 2165919 A1 | 3/2010 |
| EP | 2183150 A1 | 5/2010 |
| EP | 2238012 A1 | 10/2010 |
| EP | 2251250 A | 11/2010 |
| EP | 2323891 A1 | 5/2011 |
| EP | 2331368 A2 | 6/2011 |
| EP | 2334540 A1 | 6/2011 |
| EP | 2337728 B1 | 6/2011 |
| EP | 2463180 A1 | 6/2012 |
| EP | 2234803 B1 | 10/2012 |
| EP | 2289769 B1 | 11/2012 |
| EP | 2289771 B1 | 1/2013 |
| EP | 2553036 A1 | 2/2013 |
| EP | 2401191 B1 | 10/2013 |
| GB | 2375328 A | 11/2002 |
| JP | 2010036696 A | 2/2010 |
| WO | 2006/091794 A1 | 8/2006 |
| WO | 2009/080814 A1 | 7/2009 |
| WO | 2010/018190 A | 2/2010 |

* cited by examiner

REINFORCING DEVICES

FIELD OF THE INVENTION

The present teachings relate generally to reinforcement of cavities, and more particularly to reinforcement of vehicle cavities using structural reinforcements with associated activatable (e.g., expandable) materials.

BACKGROUND OF THE INVENTION

In various locations throughout transportation vehicles, recent years have seen the increased use of structural reinforcements in which vehicle cavities are commonly fitted with structural reinforcements that aid in controlling deformation from an impact. For some applications, it has become popular in recent years to employ a carrier structure in combination with a secondary material, such as an expandable adhesive material as part of the reinforcement. See e.g., U.S. Pat. Nos. 6,932,421; 6,921,130; 6,920,693; 6,890,021; and 6,467,834 all incorporated by reference herein for all purposes.

In addition, there are specific locations on a vehicle where buckling is a particular issue and even typical reinforcing structures are unable to manage a load to prevent the buckling. Accordingly, a structural reinforcement including a variety of sections and varying shape and form among the sections would be desirable to prevent buckling.

SUMMARY OF THE INVENTION

The present teachings meet one or more of the above needs by the improved devices described herein.

In one aspect, the present teachings pertain to a structural reinforcement comprising a rigid polymeric structure having a longitudinal axis and including a central portion and two side portions adjacent the central portion, each of the central portion and side portions including a top surface and bottom surface, an expandable adhesive material located onto at least one surface of each of the central portions and two side portions. The expandable adhesive material is located along the bottom surface of the central portion and the top surface of each of the side portions. The top surface of the central portion includes a plurality rib structures of running substantially perpendicular to the longitudinal axis and the bottom surface of each side portion includes a plurality rib structures of running substantially perpendicular to the longitudinal axis.

The structural reinforcement may also include one or more wells extending from the top surface toward the bottom surface of one or more of the side portions. The expandable adhesive material may cover at least a portion of the one or more wells. The central portion may include an extension which extends beyond a terminal end of each side portion. The extension may include a top surface that includes the expandable adhesive material. The extension may include a bottom surface including at least one rib structure running substantially perpendicular to the longitudinal axis.

Each side portion may include exactly one well, the two wells arranged opposing one another. The top surface of the central portion may be substantially free of any expandable adhesive material. The bottom surface of the side portions may be substantially free of any expandable adhesive material. Each well may be formed to have two opposing side wall structures. The two opposing side wall structures may be substantially covered by the expandable adhesive material. Each well may include a base wall arranged substantially perpendicular to one or more wall opposing side wall structures. The base wall may be substantially free of any expandable adhesive material. The bottom surface of the central portion may be substantially free of any rib structures. The top surface of the side portions may be substantially free of any rib structures.

Each side portion may include at least one well and the at least one well may extend downward from the top surface each side portion. Each side portion may include one well, and the well may be located in between a front section of the side portion and a rear section of the side portion.

The expandable adhesive material may be located onto a portion of the front section and may be integrally formed with the expandable adhesive material located onto a portion of the rear section.

The teachings herein further provide for a structural reinforcement comprising a rigid polymeric structure having a longitudinal axis and including a central portion and two side portions adjacent the central portion, each of the central portion and side portions including a top surface and bottom surface and an expandable adhesive material located onto at least one surface of each of the central portions and two side portions. The reinforcement may include one or more wells located on the side portions and extending downward from the top surface of the side portions and the expandable adhesive material may be located along the bottom surface of the central portion and the top surface of each of the side portions so that the top surface of the central portion is substantially free of any expandable adhesive material and the bottom surface of the side portions is substantially free of any expandable adhesive material. Further, the top surface of the central portion includes a plurality rib structures running substantially perpendicular to the longitudinal axis and the bottom surface of each side portion includes a plurality rib structures of running substantially perpendicular to the longitudinal axis.

The expandable adhesive material may cover at least a portion of the one or more wells. The central portion may include an extension which extends beyond a terminal end of each side portion, the extension including a top surface and bottom surface. The top surface of the extension may be substantially covered by the expandable adhesive material. The extension may include a bottom surface including at least one rib structure running substantially perpendicular to the longitudinal axis.

Each side portion may include exactly one well. The wells may be arranged opposing one another. Each well may be formed to have two opposing side wall structures. The two opposing side wall structures may be substantially covered by the expandable adhesive material. Each well may include a base wall arranged substantially perpendicular to one or more wall opposing side wall structures. The base wall may be substantially free of any expandable adhesive material. The bottom surface of the central portion may be substantially free of any rib structures. The top surface of the side portions may be substantially free of any rib structures. Each well may be located in between a front section of the side portion and a rear section of the side portion. The expandable adhesive material may be located onto a portion of the front section and may be integrally formed with the expandable adhesive material located onto a portion of the rear section.

The teachings provided herein are also directed to a method for forming a structural reinforcement comprising forming an integrally formed device having a longitudinal axis and including a central portion and one or more side portions adjacent the central portion, each of the central portion and one or more side portions including a top surface and bottom surface, locating an expandable adhesive material onto at least one surface of each of the central portions and one or more side portions, forming one or more wells on the one or more side portions that extend downward from the top surface of the one or more side portions, forming a plurality of rib structures on the top surface of the central portion including a plurality rib structures running substantially perpendicular to the longitudinal axis, and forming a plurality of rib structures on the bottom surface of each side portion including a plurality rib structures of running substantially perpendicular to the longitudinal axis.

The method may be substantially free of locating an expandable adhesive material onto the top surface of the central portion. The method may be substantially free of locating an expandable adhesive material onto the bottom surface of the one or more side portions.

The devices disclosed herein are designed with rib structures, wells and expandable adhesives located at locations along the reinforcement structure in an effort to minimize buckling and cracking along the device.

DETAILED DESCRIPTION

Figure 1:
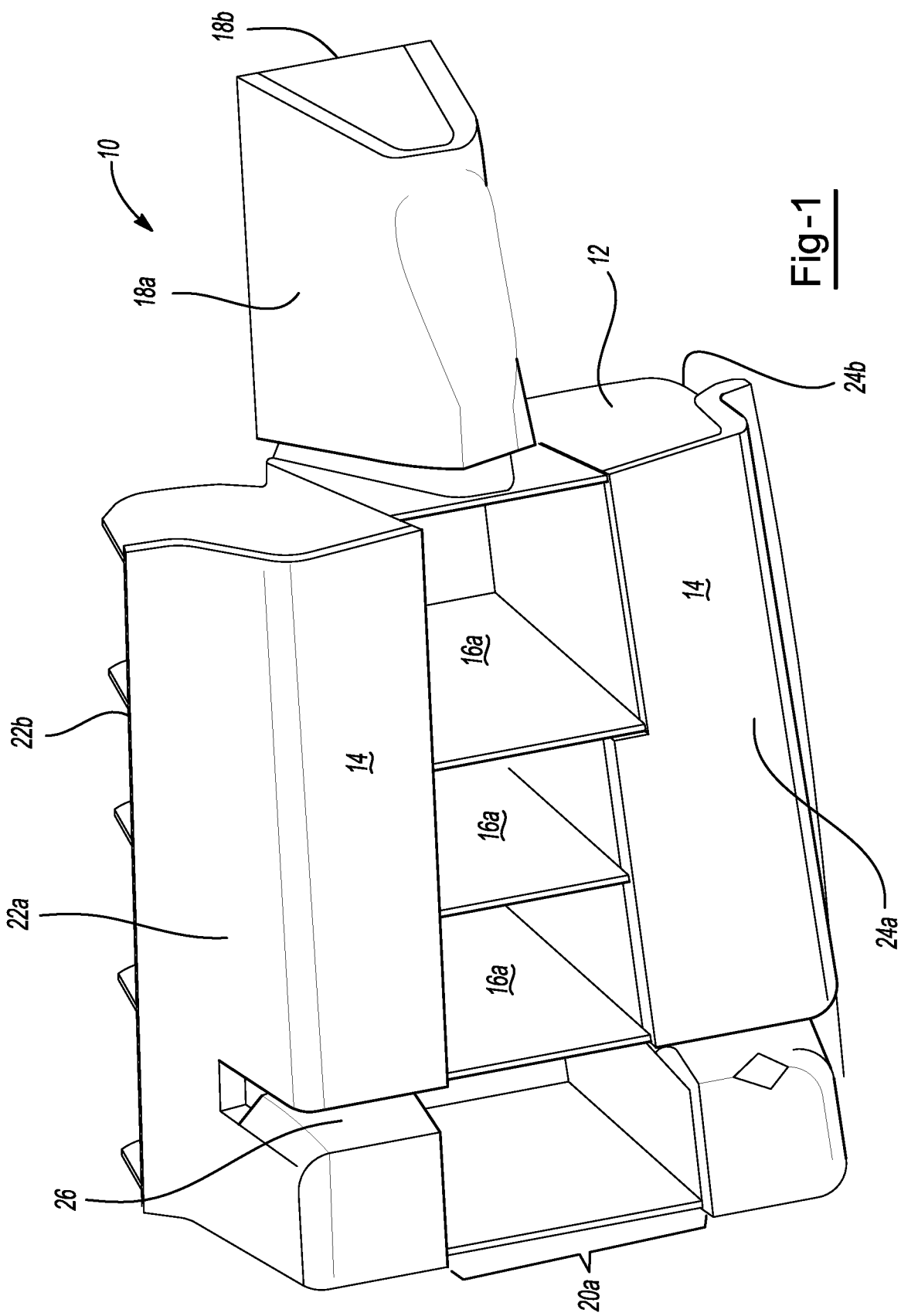
FIG. 1 is a perspective top view of an illustrative reinforcement in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/445,048, filed on Jan. 11, 2017, the contents of this application being hereby incorporated by reference for all purposes.

The teachings presented herein contemplate a unique approach for providing structural reinforcement in a vehicle structure, especially in areas where buckling of a cavity and/or of a reinforcement within a cavity is common. Such areas may include but may not be limited to, areas within or adjoining vehicle pillars and/or roof sections.

The rigid polymeric structure may be formed of a moldable material, which may be any polymeric material, which may be a polyamide material. The rigid polymeric structure may be formed by pultrusion. The polymeric material may be a reinforced polymeric material. For example, the polymeric material may be a glass fiber reinforced material. The polymeric material may be a polyurethane. The polymeric material may be a thermoset material. The polymeric material may be a thermoplastic material. The polymeric material may be a thermoplastic epoxy material. The polymeric material may be a fiber reinforced thermoplastic epoxy material.

The activatable material may be activated to expand, cure, or some combination thereof. The activatable material may be one or some combination of an adhesive, reinforcing and/or sealant material. The expandable material may be a material that experiences expansion and/or cure upon exposure to temperatures of between about 148.89° C. to about 204.44° C. (about 300° F. to about 400° F.) (i.e., temperatures typically experienced in automotive painting or coating operations). The expandable material may be foamed to a volume of at least 5% greater, at least 50% greater, at least 200% greater, at least 1000% greater, at least 2000% greater, at least 5000% greater or higher relative to the original unexpanded (e.g., green state) volume.

The expandable material may be an epoxy based material such as those disclosed in U.S. Pat. Nos. 5,884,960; 6,348,513; 6,368,438; 6,811,864; 7,125,461; 7,249,415; and U.S. Patent Publication No. 2004/0076831, hereby incorporated by reference herein for app purposes.

The reinforcement devices described herein may be formed with one or more well structures. These well structures act to separate a first portion of the device from a second portion of the device. These well structures may include one or more walls surrounding the wells. These walls may include side walls and base walls. One or more walls may include the expandable material. One or more walls may be substantially free of any expandable material.

The reinforcement devices may also be formed with a plurality of rib structures. More specifically certain sections of the device may include ribs on only a single surface (e.g., on only the top surface or only the bottom surface). The sections of the device may be arranged in an alternating manner, such that a first section may include ribs on only the top surface of the section, whereas an adjacent section may include ribs on only the bottom surface of the section. Thus, each portion of the device (e.g., each central portion, each side portion) may be located adjacent one or more portions that include ribs only on an opposing surface.

It is also possible that the expandable material may be located onto only select surfaces of the device. For example, the expandable material may be located onto a top or bottom surface of a portion (e.g., the central portion or side portion) of the device. It is possible that the expandable material be located onto surfaces of the portions that do not carry any rib structures.

The arrangement of the ribs, the location of the well structures, the location of the expandable material or some combination of these variables, provides a device where selected portions of the device are less likely to buckle and/or crack. As an example, the location of a well structure may prevent a crack from travelling from a first portion of the device to a second portion of the device.

Figure 2:
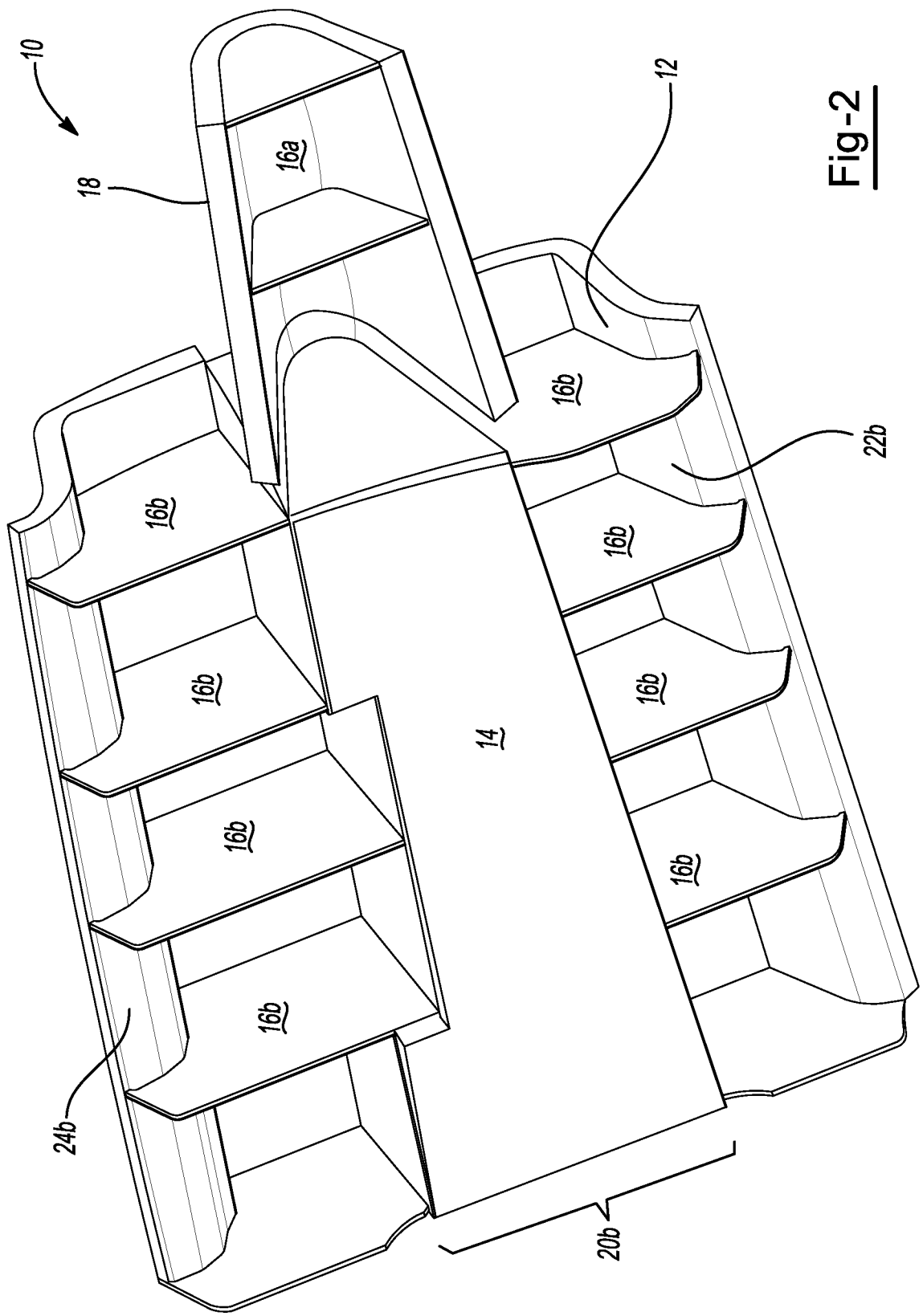
FIG. 2 is a perspective bottom view of the reinforcement of FIG. 1.
Figures 3, 4:
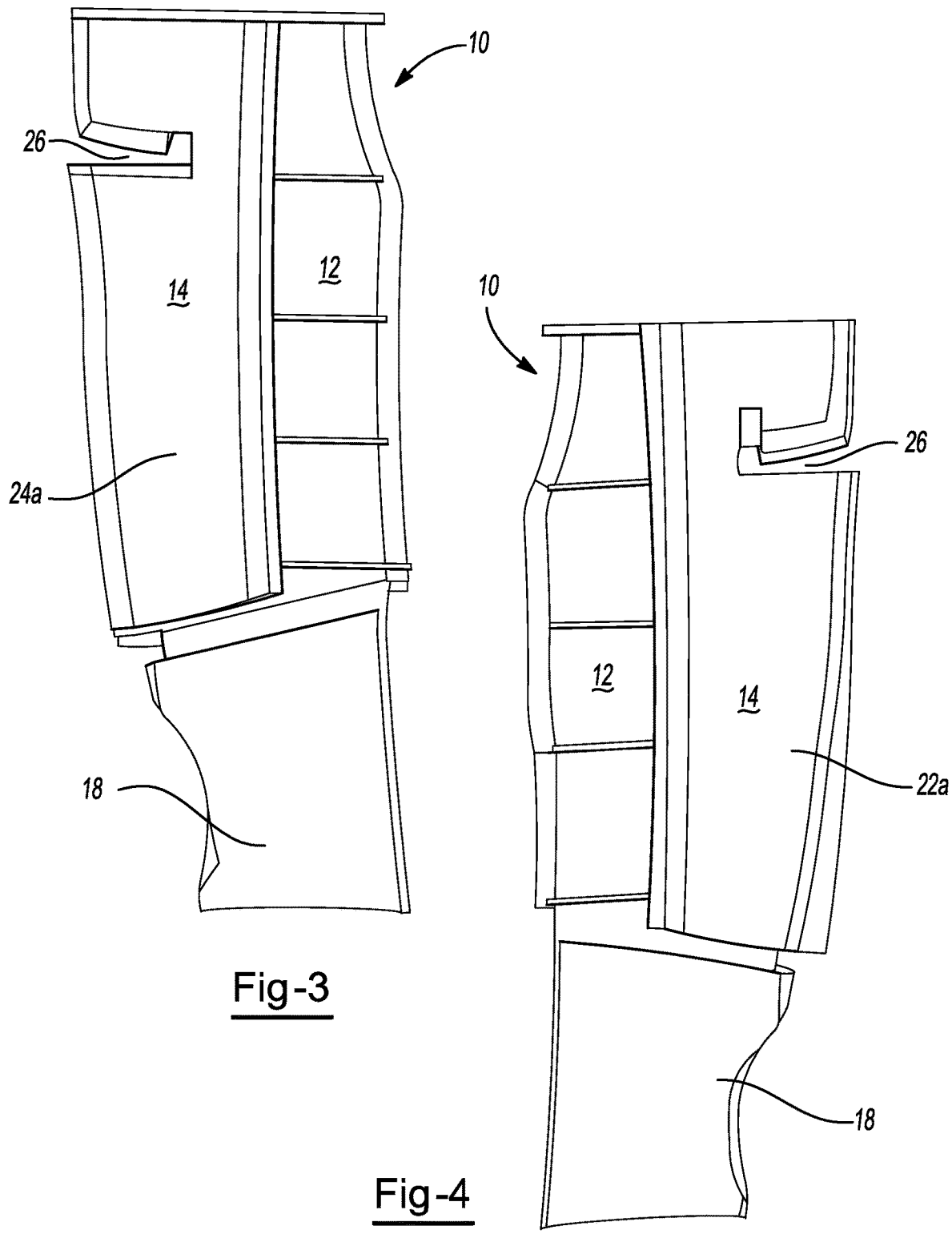
FIG. 3 is a side profile view of the reinforcement of FIG. 1.
FIG. 4 is an opposing side profile view of the reinforcement of FIG. 1.
Figure 5:
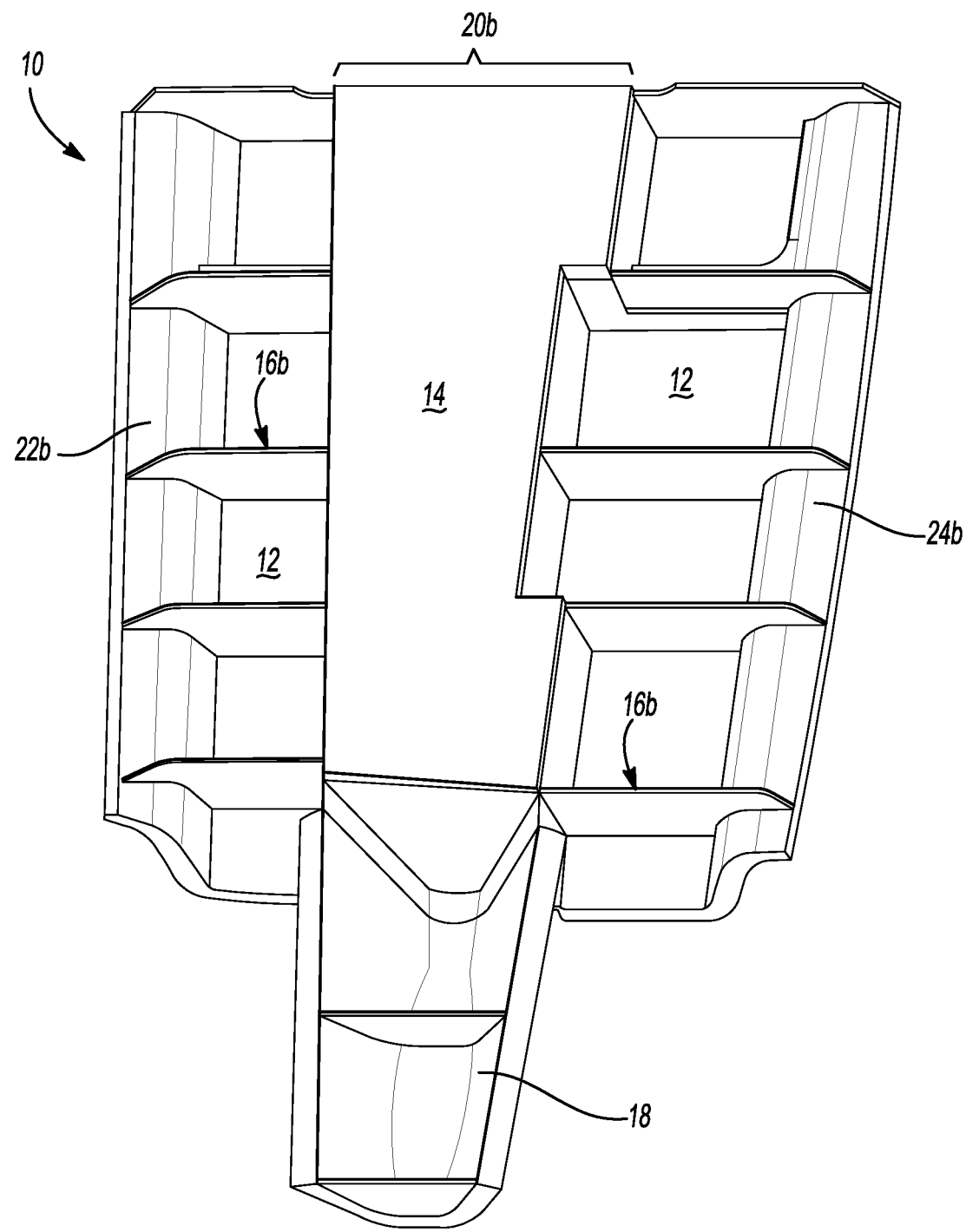
FIG. 5 is a bottom up view of the reinforcement of FIG. 1.
Figure 6:
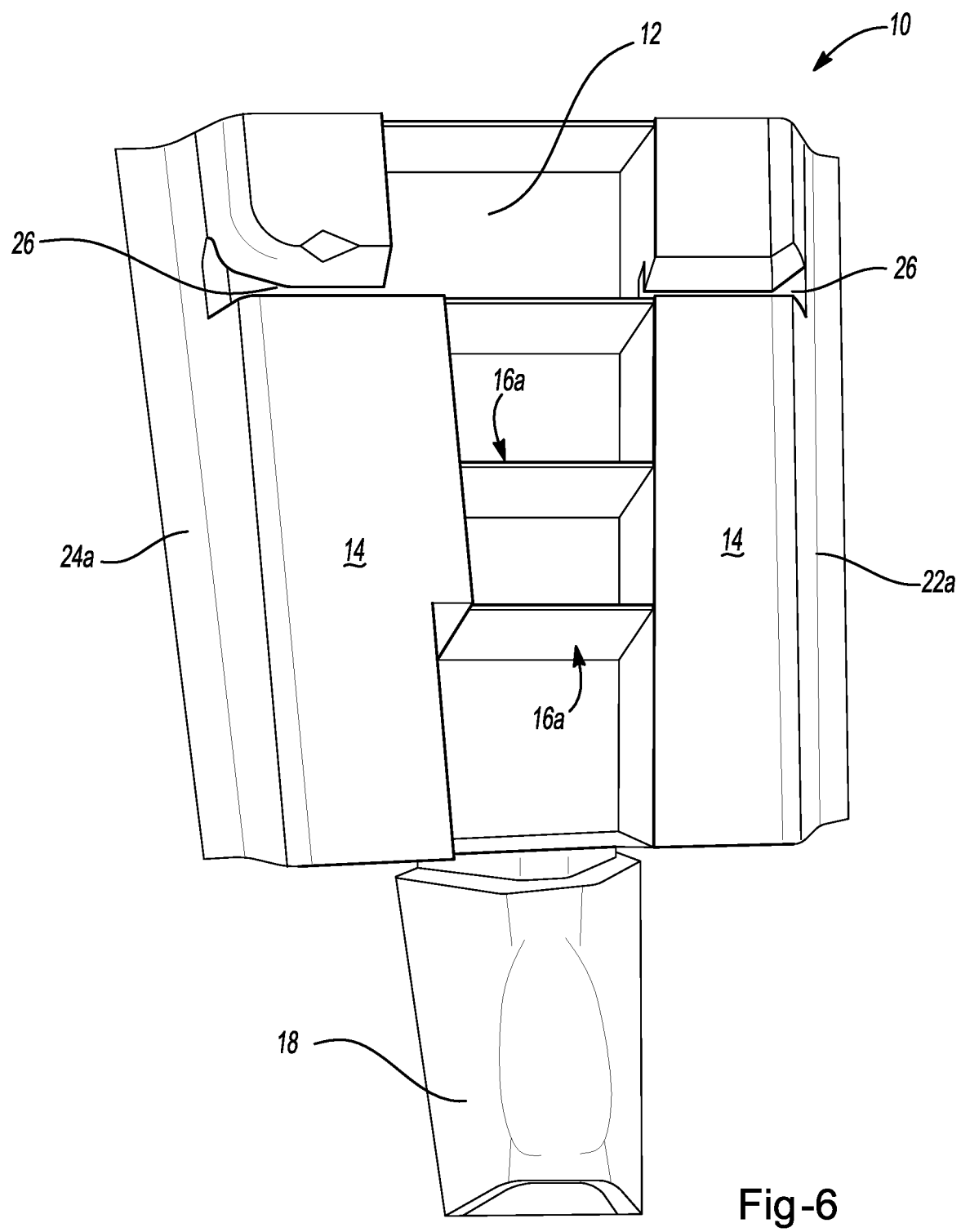
FIG. 6 is a top down view of the reinforcement of FIG. 1.
Figure 7:
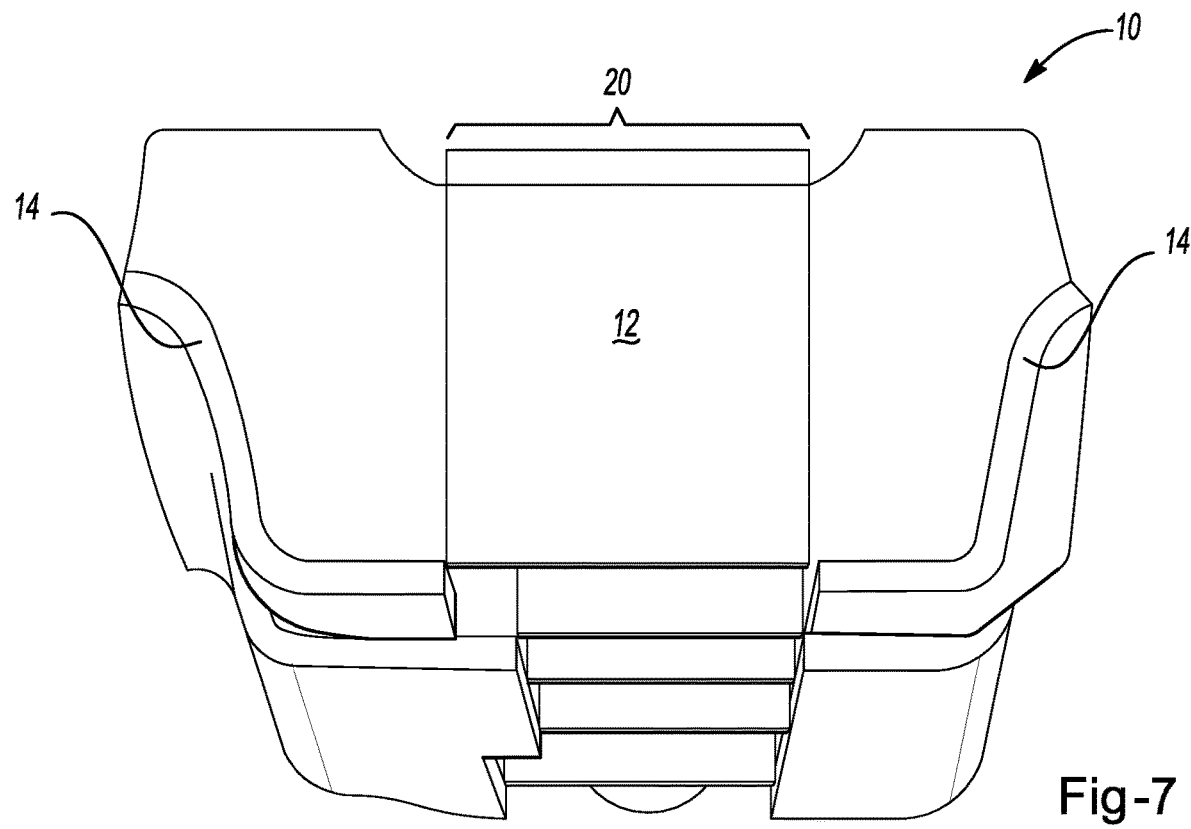
FIG. 7 is front elevational view of the reinforcement of FIG. 1.
Figure 8:
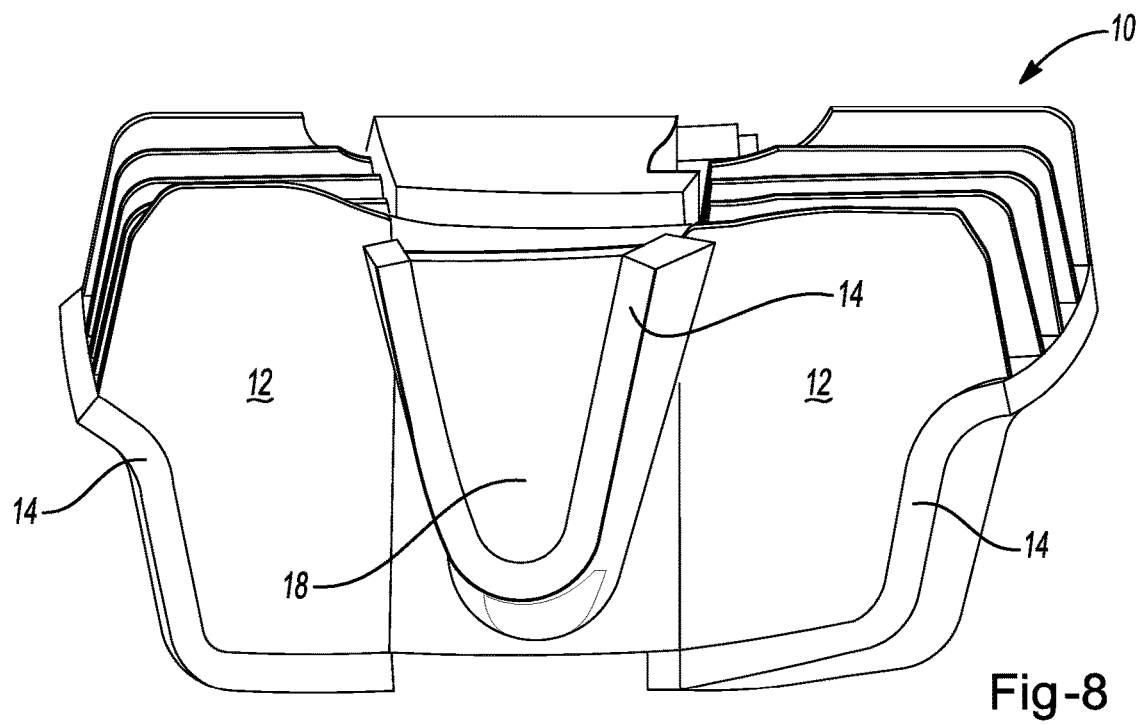
FIG. 8 is rear elevational view of the reinforcement of FIG. 1.

As shown for example in FIGS. 1-8, the reinforcement structure 10 is shown having a rigid polymeric structure 12 including a central portion 20, and two side portions 22, 24. Each side portion includes a top surface 22a, 24a and a bottom surface 22b, 24b. Portions of each of the central portion 20 and side portions 22, 24 may include an expandable material 14 located thereon. The central portion also includes a top surface 20a and a bottom surface 20b. The top surface 20a of the central portion includes a plurality of rib structures 16a located perpendicular to a longitudinal axis of the reinforcement structure 10. The bottom surface 20b of the central portion 20 includes a layer of expandable material 14. The bottom surface 22b, 24b of each side portion 22, 24 includes a plurality of rib structures 16b which are also arranged perpendicular to a longitudinal axis of the reinforcement structure 10.

As further depicted in FIGS. 1-8, the reinforcement structure 10 includes an extension 18, including a top surface 18a having expandable material 14 located thereon and a bottom surface 18b including a rib structure 16a. Further, the reinforcement structure may include one or more wells 26 that extend from the top surface of each side portion 22a, 24a downward toward bottom surface of each side section 22b, 24b.

The rigid polymeric structure may be formed by an injection molding step. The expandable material may be applied to the rigid polymeric structure by a second molding process (e.g., a two-shot molding process) whereby the adhesive material is injection molded onto the base reinforcing structure.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural reinforcement comprising:
   i) a rigid polymeric structure having a longitudinal axis and including a central portion and two side portions adjacent the central portion, each of the central portion and side portions including a top surface and bottom surface;
   ii) one or more wells extending from the top surface toward the bottom surface of one or more of the side portions;
   ii) an expandable adhesive material located onto at least one surface of each of the central portions and two side portions;
   wherein the expandable adhesive material is located along the bottom surface of the central portion and the top surface of each of the side portions; and
   wherein the top surface of the central portion includes a plurality rib structures of running substantially perpendicular to the longitudinal axis and the bottom surface of each side portion includes a plurality rib structures of running substantially perpendicular to the longitudinal axis.

2. The structural reinforcement of claim 1, wherein the expandable adhesive material covers at least a portion of the one or more wells.

3. The structural reinforcement of claim 1, wherein the central portion includes an extension which extends beyond a terminal end of each side portion.

4. The structural reinforcement of claim 3, wherein the extension includes a top surface that includes the expandable adhesive material.

5. The structural reinforcement of claim 3, wherein the extension includes a bottom surface including at least one rib structure running substantially perpendicular to the longitudinal axis.

6. The structural reinforcement of claim 1, wherein each side portion includes exactly one well, the two wells arranged opposing one another.

7. The structural reinforcement of claim 1, wherein the top surface of the central portion is substantially free of any expandable adhesive material.

8. The structural reinforcement of claim 1, wherein the bottom surface of the side portions are substantially free of any expandable adhesive material.

9. The structural reinforcement of claim 1, wherein the one or more wells each include at least two opposing side wall structures that are substantially covered by the expandable adhesive material.

10. The structural reinforcement of claim 1, wherein each well includes a base wall arranged substantially perpendicular to one or more wall opposing side wall structures.

11. The structural reinforcement of claim 10, wherein the base wall is substantially free of any expandable adhesive material.

12. The structural reinforcement of claim 1, wherein the bottom surface of the central portion is substantially free of any rib structures.

13. The structural reinforcement of claim 1, wherein the top surface of the side portions is substantially free of any rib structures.

14. The structural reinforcement of claim 1, wherein each side portion includes one well, and the well is located in between a front section of the side portion and a rear section of the side portion.

15. The structural reinforcement of claim 14, wherein the expandable adhesive material is located onto a portion of the front section and is integrally formed with the expandable adhesive material located onto a portion of the rear section.

16. A structural reinforcement comprising:
   i) a rigid polymeric structure having a longitudinal axis and including a central portion and two side portions adjacent the central portion, each of the central portion and side portions including a top surface and bottom surface;
   ii) an expandable adhesive material located onto at least one surface of each of the central portions and two side portions;
   iii) one or more wells located on the side portions and extending downward from the top surface of the side portions;
   wherein the expandable adhesive material is located along the bottom surface of the central portion and the top surface of each of the side portions so that the top surface of the central portion is substantially free of any expandable adhesive material and the bottom surface of the side portions is substantially free of any expandable adhesive material; and
   wherein the top surface of the central portion includes a plurality rib structures running substantially perpendicular to the longitudinal axis and the bottom surface of each side portion includes a plurality rib structures of running substantially perpendicular to the longitudinal axis.

17. The structural reinforcement of claim 16, wherein the central portion includes an extension which extends beyond a terminal end of each side portion, the extension including a top surface and bottom surface.

18. The structural reinforcement of claim 16, wherein each well is located in between a front section of the side portion and a rear section of the side portion.

19. The structural reinforcement of claim 18, wherein the expandable adhesive material is located onto a portion of the front section and is integrally formed with the expandable adhesive material located onto a portion of the rear section.

20. A method for forming a structural reinforcement comprising:
   forming an integrally formed device having a longitudinal axis and including a central portion and one or more side portions adjacent the central portion, each of the central portion and one or more side portions including a top surface and bottom surface;
   locating an expandable adhesive material onto at least one surface of each of the central portions and one or more side portions;
   forming one or more wells on the one or more side portions that extend downward from the top surface of the one or more side portions;
   forming a plurality of rib structures on the top surface of the central portion including a plurality rib structures running substantially perpendicular to the longitudinal axis; and
   forming a plurality of rib structures on the bottom surface of each side portion including a plurality rib structures of running substantially perpendicular to the longitudinal axis.

* * * * *